United States Patent [19]

Harradine

[11] Patent Number: 5,087,966
[45] Date of Patent: Feb. 11, 1992

[54] DIGITAL GAMMA CORRECTION

[75] Inventor: Vincent C. Harradine, Basingstoke, England

[73] Assignee: Sony Corporation, Tokyo, Japan

[21] Appl. No.: 482,049

[22] Filed: Feb. 20, 1990

[30] Foreign Application Priority Data

Apr. 21, 1989 [GB] United Kingdom ............ 8909145

[51] Int. Cl.$^5$ ............ H04N 9/64; H04N 9/69; H04N 9/72; G03F 3/08
[52] U.S. Cl. ............ 358/27; 358/32; 358/34; 358/80; 358/164
[58] Field of Search ............ 358/27, 29, 80, 32, 358/34, 164, 171

[56] References Cited

U.S. PATENT DOCUMENTS

| 3,604,841 | 9/1971 | Ettlinger | 358/27 |
| 4,962,418 | 11/1990 | Kamaga | 358/27 |

Primary Examiner—James J. Groody
Assistant Examiner—Glenton B. Burgess
Attorney, Agent, or Firm—Alvin Sinderbrand; William S. Frommer

[57] ABSTRACT

A digital color corrector for a color component of a video signal is operable to effect gamma, gain and black level correction. The gamma correction k is applied to a multiplier receiving the input signal E. Black level correction B is applied to an adder, and further arithmetic circuits are provided together with gain correction A to implement the equation $$\delta E = [k \cdot E + (A - B - k)] \cdot E + B$$

which includes a good approximation of the gamma correction without the need to use log and anti-log circuits. The output $\delta E$ represents an offset correction signal to be added to the original color component signal.

12 Claims, 3 Drawing Sheets

DIGITAL GAMMA CORRECTION

BACKGROUND OF THE INVENTION

1. Field of the Invention

This invention relates to digital color correction which may be used in color video systems.

2. Description of the Prior Art

In color correction apparatus for adjustment of the primary colors, for example for use in video broadcasting applications, the controls generally include separate adjustments for gain, black level and gamma (described in greater detail below) for each of the three primary colors, namely red (R), green (G) and blue (B). Other controls may also be provided, such as luminance (Y) input gain, chroma input gain and overall output gain. Existing color correction apparatus generally operates in the analog domain. In order to provide a digital implementation of such apparatus, it would be relatively simple to perform gain and black adjustments using digital hardware, since gain adjustment involves multiplication by a factor and black adjustment involves addition of a constant, both of which operations can be readily performed digitally. However, as will now be explained, gamma correction involves a non-linear function and this causes problems for digital implementation.

The characteristic of picture display devices such as cathode ray tubes (CRTs) is non-linear, and it is therefore necessary within a television transmission system to compensate for this non-linearity at the transmitter. A typical input/output relationship for a CRT is shown in FIG. 1 of the accompanying drawings, the characteristic being shown of signal voltage (VS) against light output (LO). The illustrated curve may be described by a power law, as follows:

$$L = K \cdot E^\gamma \tag{1}$$

where:
L is the light output (LO) of the CRT
K is a constant
E is the signal voltage (VS)
γ (gamma) is a constant.

Hence, as will be seen in FIG. 1 and is apparent from the equation (1), the light output increases more rapidly than the signal voltage.

If the source of the video signals is assumed to be a monochrome camera having a linear input/output characteristic, then the effect of the CRT will be to stretch out changes in luminance in the highlight areas and to compress these changes in the low light areas. Therefore, in order to compensate for these effects, the transmitter must have the inverse law to that of the CRT; the term given to the process that produces this inverse law is gamma correction. An example of the combined effect of a camera and a gamma correction circuit is shown in FIG. 2 of the accompanying drawings, which shows the relationship between the light on the camera tube (LC) and the transmitter output (TO). As will be apparent, the characteristic of FIG. 2 compensates for the characteristic of FIG. 1, and the overall effect is to produce a linear system.

In any particular system, gamma will be a constant, typically between about 2.2 and 2.5. However, as a result of incorrect lighting conditions or the like, it may be necessary to vary the amount of gamma correction to be applied.

In theory, one method of gamma correction would involve hardware implementation of the equation (1). In the analog domain, this could be achieved by using log and anti-log amplifiers with an interposed amplifier whose gain may be varied. Such an arrangement is shown in the block circuit diagram of FIG. 3 of the accompanying drawings. An input signal x is applied to a log converter 10 whose output a is supplied to a gamma adjust amplifier 12. The gamma adjustment is set by the gain of the amplifier 12, and therefore if the gamma adjustment is to be changed, the gain of the amplifier 12 is changed. The output b of the amplifier 12 is fed to an anti-log converter 14 which produces an output signal y.

It will be seen that the following relationships apply.

$$y = e^b = e^{\gamma \cdot a} = e^{\gamma \cdot \log x}$$

$$\log y = \gamma \log x \cdot \log e$$

$$\log y = \log x^\gamma$$

$$y = x^\gamma$$

In order to implement the circuit of FIG. 3 in hardware form, it would be necessary to use, for example, arrays of diodes so as to obtain the required log and anti-log characteristics. However, for color correction purposes, it is difficult to match the diode arrays for the three color RGB channels, and also, temperature stability is a problem. In a digital color corrector, the circuit of FIG. 3 could be implemented using programmable read only memories (PROMs) in which the log and anti-log characteristics have been mapped. However, the problem with this method would be truncation of the characteristic in order to enable a sensible word size to be used.

SUMMARY OF THE INVENTION

It is an object of the present invention to provide a color correction apparatus which can effect gamma, gain and black level correction to a digital video signal.

It is a further object of the present invention to provide a color correction apparatus for gamma correction of a color component signal of a video signal which does not require the provision of log and anti-log circuits.

According to an aspect of the present invention there is provided a color correction apparatus comprising:

first multiplying means for receiving a color component signal of a video signal and for multiplying the component signal by a first factor indicative of a desired gamma correction to produce a first multiplied signal;

first summing means for adding a second factor to the first multiplied signal to produce a first summed signal, the second factor being indicative of the desired gamma correction, a desired gain and a desired black level;

second multiplying means for multiplying the first summed signal by the color component signal to produce a second multiplied signal; and second summing means for adding a third factor indicative of the desired black level to produce an offset correction signal to be added to the color component signal.

According to another aspect of the present invention there is provided a color correction apparatus for gamma correction of a color component signal of a video signal, the apparatus comprising:

first multiplying means for multiplying the color component signal by a factor indicative of a desired gamma correction to produce a multiplied signal;

summing means for adding the factor to the first multiplied signal to produce a summed signal; and second multiplying means for multiplying the summed signal by the color component signal to produce an offset gamma corrected signal to be added to the color component signal.

According to the former aspect, apparatus according to the present invention can provide gamma, gain and black level correction, whereas according to the latter aspect, gamma correction is provided.

In a preferred embodiment of the invention, to be described in greater detail hereinafter, a digital color corrector for a color component of a video signal is operable to effect gamma, gain and black level correction. The gamma correction k is applied to a multiplier receiving the input signal E. Black level correction B is applied to an adder, and further arithmetic circuits are provided together with gain correction A to implement the equation $$\delta E = [k \cdot E + (A - B - k)] \cdot E + B$$

which includes a good approximation of the gamma correction without the need to use log and anti-log circuits. The output $\delta E$ represents an offset correction signal to be added to the original color component signal.

In the preferred color correction apparatus, an offset correction signal is generated by the apparatus for adding to the original signal thereby generating the resultant color corrected output. Thus the original signal does not pass through the color correction apparatus and this minimizes distortion.

The preferred color correction apparatus can be used with both 4:2:2 component (as specified in CCIR Recommendation 601) and 4Fsc composite systems. In the case of the 4Fsc composite system, it is necessary to decode the input composite signal into R, G and B components to be supplied to the color correction apparatus; the correction offset generated by the apparatus is then encoded back into composite form and added to the original composite signal.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
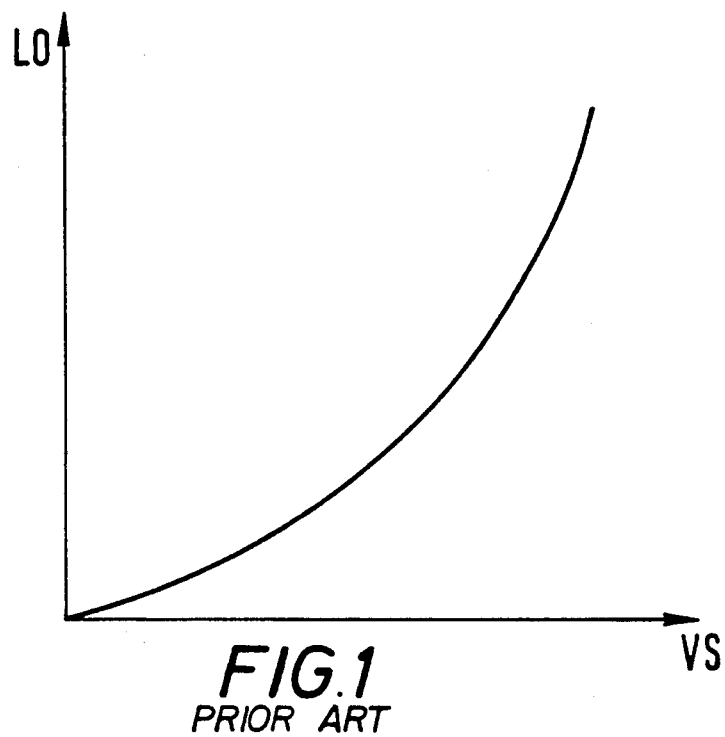
FIG. 1 shows an input/output characteristic of a CRT.
Figure 2:
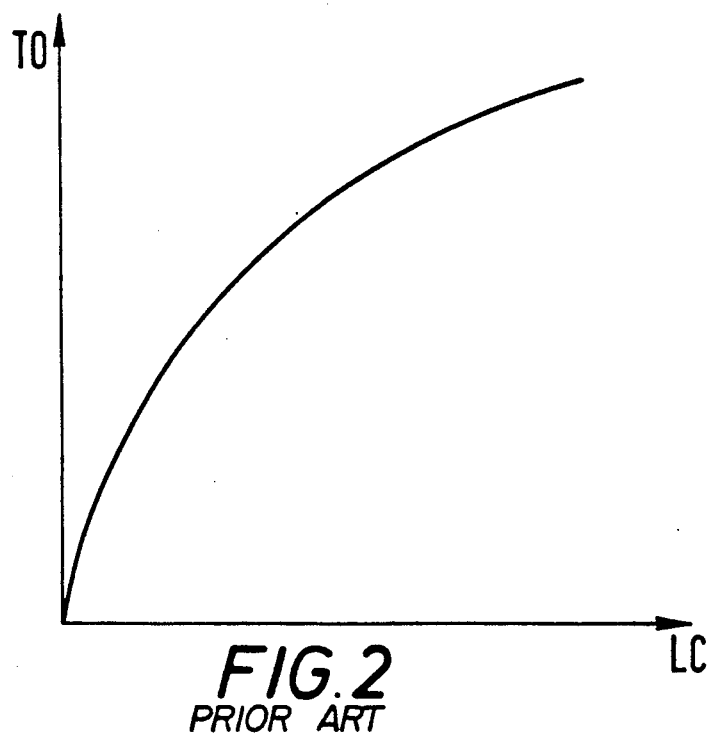
FIG. 2 shows an input/output characteristic of a camera and transmitter.
Figure 3:
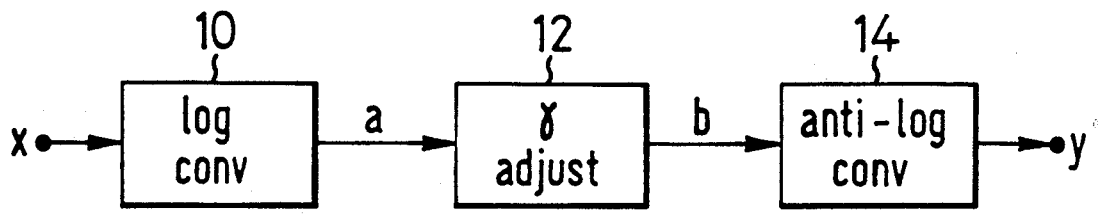
FIG. 3 shows a circuit which can operate according to one method of gamma correction.

As discussed above with reference to FIG. 3, providing color correction by implementation of the equation (1) causes problems, both in the analog and digital domains. Color correction apparatus embodying this invention makes use of a different approach which avoids the need to implement log and anti-log functions. The theory underlining this approach will now be discussed.

Let E be a gamma corrected signal voltage.

$$E = U^\gamma$$

where U is the uncorrected signal voltage.

In order to effect a change a in gamma, $$\begin{aligned} V &= U^{\gamma+a} \\ &= U^\gamma \cdot U^a \\ &= E \cdot (E^{(1/\gamma)})^a \\ &= E^{1+a/\gamma} \end{aligned}$$

If a is defined as a percentage of gamma, $a = x \cdot \gamma$ then $V = E^{1+x}$.

Therefore the variation in gamma $\Delta \gamma = E^{1+x} - E$.

Using a square law approximation to the variation in gamma $$\Delta \gamma' = k E^2 + m E$$

where k and m are as derived below.

The error in approximation $$\begin{aligned} e &= \Delta \gamma' - \Delta \gamma \\ &= [k \cdot E^2 + m \cdot E] - [E^{(1+x)} - E] \end{aligned}$$

In order for minimum error at black level and peak white (i.e. 0 and 1), let E=1 and e=0.
Hence $$0 = [k + m] - [1 - 1]$$

and $$k = -m$$

The error in approximation may be found by integration of e over the range 0 to 1 in order to determine k.

$$\int_0^1 e \, dE = \left[ \frac{k \cdot E^3}{3} - \frac{k \cdot E^2}{2} - \frac{E^{(2+x)}}{(2+x)} + \frac{E^2}{2} \right]_0^1$$

$$= \frac{k}{3} - \frac{k}{2} - \frac{1}{2+x} + \frac{1}{2}$$

Let $-\frac{k}{6} - \frac{1}{2+x} + \frac{1}{2} = 0$ $$\frac{k}{6} = \frac{-2 + 2 + x}{4 + 2 \cdot x}$$

$$k = \frac{3 \cdot x}{2 + x}$$

Hence $\delta \gamma = k \cdot (E^2 - E)$ \hfill (2)

where:

$\delta\gamma$ is an approximation to the variation in gamma,
E is the input voltage,
k is a variable quantity.

Thus the equation (2) provides an approximation of the gamma variation without involving log and anti-log functions.

For correction of the black level and the gain in addition to the gamma, the black level offset B has to be added to form the corrected offset output, as does a further term based on the gain coefficient A. Since the black level is interactive with the gain coefficient A, it is necessary to subtract the black level offset B from the gain coefficient A before multiplication of the input signal E. Thus the further term to be added to form the offset output is $(A-B)\cdot E$, and the overall offset correction factor to be added to the input signal E so as to generate the color corrected output may be expressed as:

$$\delta E = k\cdot(E^2 - E) + (A-B)\cdot E + B$$

$$\delta E = k\cdot E^2 - kE + (A-B)\cdot E + B$$

$$\delta E = [k\cdot E + (A-B-k)]\cdot E + B \quad (3)$$

If $\alpha = A - B - k$, then the equation (3) can be simplified to $$\delta E = (k\cdot E + \alpha)\cdot E + B \quad (4)$$

Figure 4:
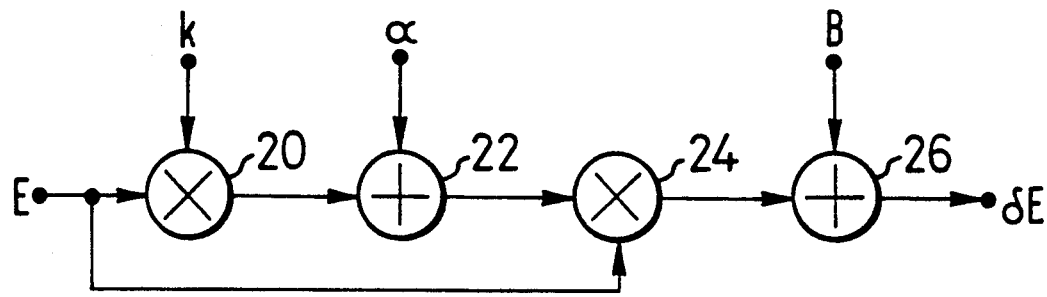
FIG. 4 is a schematic block diagram of color correction apparatus according to one embodiment of this invention.

FIG. 4 shows a circuit embodying the present invention, in which the equation (4) is implemented in the digital domain. A first multiplier 20 receives the input signal and multiplies it by the factor k to produce a signal k·E which is applied to a first adder 22. The first adder 22 adds the factor $\alpha$ to the signal k·E to produce a summed output $k\cdot E + \alpha$. A second multiplier 24 multiplies this by the input signal E once more to produce an output $(k\cdot E + \alpha)\cdot E$ which is supplied to a second adder 26. The second adder 26 adds the black level factor B, and this completes the equation (4) thereby producing the offset correction factor $\delta E$ for adding to the input signal E.

Figure 5:
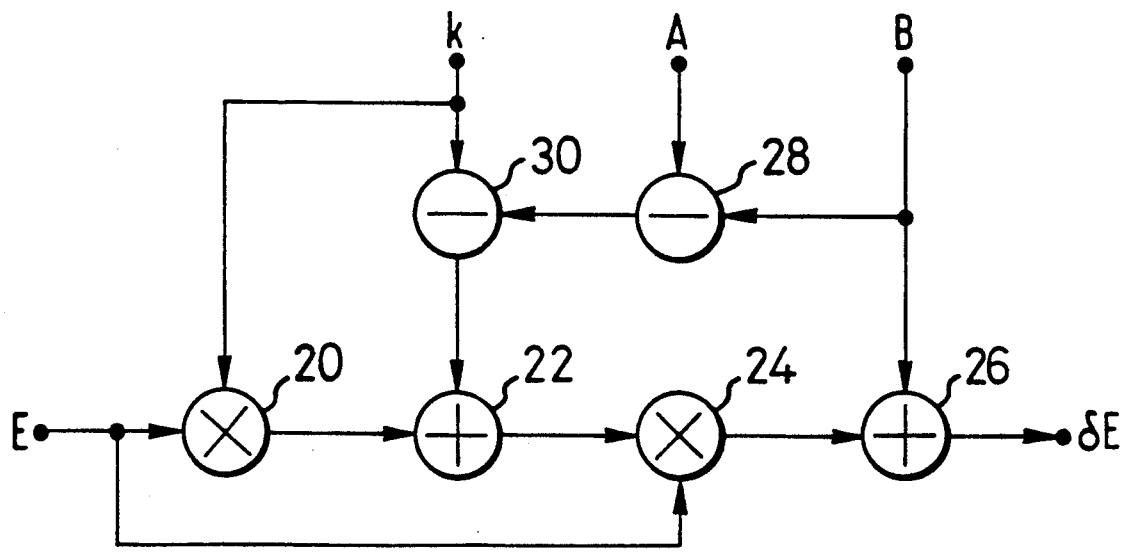
FIG. 5 is a schematic block diagram similar to that of FIG. 4 but including further details.

The circuit shown in FIG. 4 is effective if the equipment includes microprocessor capability to derive the factor $\alpha$ from the factors A, B and k. Alternatively, the circuit shown in FIG. 5 can be used and, since this circuit implements the equation (3) directly, there is no need to derive the factor $\alpha$ separately. The circuit shown in FIG. 5 is similar to that of FIG. 4 except that first and second subtracters 28, 30 are provided, the first subtracter 28 deriving a signal A—B from the factors A and B, and the second subtracter 30 deriving a signal A—B—k from the output A—B of the first subtracter 28 and from the factor k. The signal A—B—k is then applied to the first adder 22 for adding to the signal k·E from the first multiplier 20.

Figure 6:
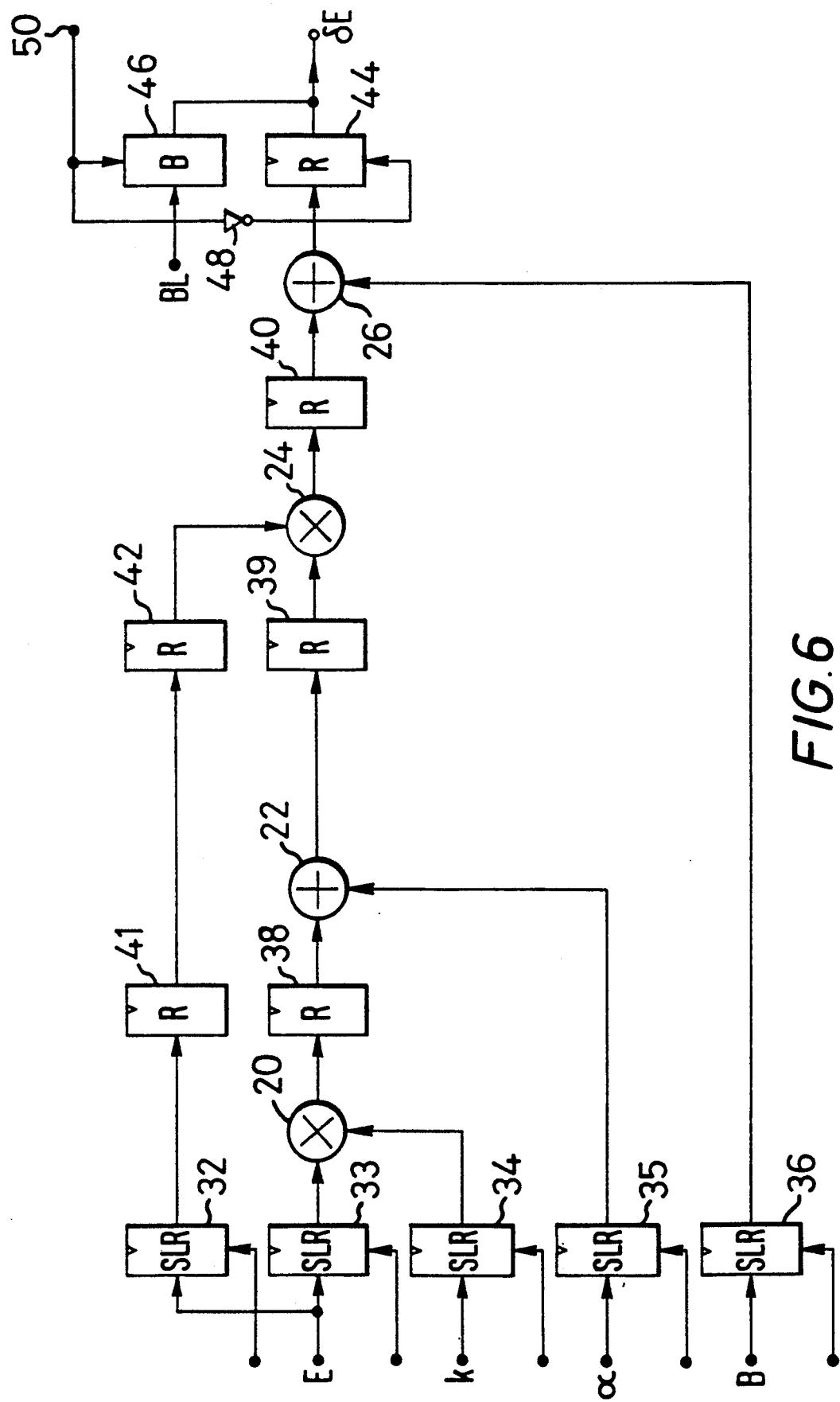
FIG. 6 is a more detailed block diagram of color correction apparatus embodying this invention.

A more developed circuit embodying the invention is shown in FIG. 6, and this circuit is particularly suitable for implementation in gate array technology. As well as the first and second multipliers 20, 24 and the first and second adders 22, 26, the circuit includes five synchronously loadable registers (SLRs) 32 to 36 for the input signal E and for the factors k, $\alpha$ and B. Further registers 38 to 42 are provided between the arithmetic components. At the output of the second adder 26, a selective blanking circuit is provided, in the form of a register 44, a buffer amplifier 46 and an inverter 48. A blanking level signal BL is applied to an input of the buffer amplifier 46. The selective blanking circuit is provided to blank the output to a preset level when enabled so as to prevent parts of the video signal such as synchronization pulses from being undesirably affected by the color corrector circuit. When an enable signal is present at a blanking enable terminal 50, the register 44 is disabled and the buffer amplifier 46 is enabled thereby applying the blanking level signal BL to the output instead of the offset correction signal $\delta E$. The other parts of the circuit of FIG. 6 operate in a similar manner to that of FIG. 4, the registers 38 to 42 holding the outputs of the preceding components. The registers 41 and 42 provide a delay which corresponds to that provided by the registers 38 and 39.

Whichever of the above-described color corrector circuits is used, three of the circuits will need to be provided for processing digital color component signals, one circuit for each component.

As will be apparent from the above description, each of the color corrector circuits embodying the present invention is arranged such that an offset signal is generated by the circuit and is added to the original signal so as to generate the resultant color corrected output. Thus the original signal does not pass through the circuit, resulting in minimum distortion effects such as quantization noise due to truncation at multiplier outputs, for example in RGB and YCbCr matrices provided in other parts of the equipment. Also, if color correction is not required, the circuit can be switched out with no adverse effect on the original signal.

The color corrector circuits can be used in either component or composite video systems, such as the CCIR Recommendation 601 4:2:2 component and 4Fsc composite systems. In the case of composite systems, it is necessary to decode the input composite signal into three components for application to the three corresponding correction circuits. The correction offsets generated by these circuits are then encoded back into composite form and added to the original composite signal.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. Color correction apparatus for correction of a color component signal of a video signal comprising:
    first multiplying means for receiving a color component signal of a video signal and for multiplying the component signal by a first factor indicative of a desired gamma correction to produce a first multiplied signal;
    first summing means for adding a second factor to the first multiplied signal to produce a first summed signal, said second factor being indicative of the desired gamma correction, a desired gain and a desired black level;
    second multiplying means for multiplying the first summed signal by the color component signal to produce a second multiplied signal; and
    second summing means for adding a third factor indicative of the desired black level to produce an offset correction signal to be added to the color component signal.

2. Apparatus according to claim 1, wherein said second factor comprises a fourth factor indicative of the desired gain minus the first and third factors.

3. Apparatus according to claim 2, further comprising first substracting means for subtracting said third factor from said fourth factor to produce a first substracted signal, and second substracting means for subtracting said first factor from said first subtracted signal to produce a second subtracted signal, said second subtracted signal forming said second factor added by the first summing means.

4. Apparatus according to claim 1, further comprising a separate register for each input of the first and second multiplying means and of the first and second summing means.

5. Apparatus according to claim 1, further comprising blanking means for selectively blanking the offset correction signal to a predetermined blanking level during predetermined portions of said video signal.

6. Color correction apparatus for effecting gamma correction of a color component signal of a video signal, the apparatus comprising:
   first multiplying means for multiplying the color component signal by a first factor indicative of a desired gamma correction to produce a multiplied signal;
   summing means for adding a second factor which is a function of said desired gamma correction to the first multiplied signal to produce a summed signal; and
   second multiplying means for multiplying said summed signal by the color component signal to produce an offset gamma corrected signal, when added to a black level offset correction signal, for addition to the color component signal.

7. An apparatus according to claim 4, further comprising blanking means for selectively blanking the offset correction signal to a predetermined blanking level during predetermined portions of said video signal.

8. An apparatus according to claim 7, wherein said blanking means includes:
   first buffer amplifying means for amplifying a blanking level signal to produce a first amplified signal, said first buffer amplifying means enabled by an enable signal;
   inverting means for inverting said enable signal to produce an inverted enable signal; and
   third summing means for adding said first amplified signal and said offset correction signal to produce a selectively blanked offset correction signal, said third summing means including a register for the offset correction signal input and which is enabled by said inverted enable signal.

9. An apparatus according to claim 6, further comprising blanking means for selectively blanking said offset gamma corrected signal to a predetermined blanking level during predetermined portions of said video signal.

10. Color correction apparatus according to claim 6, further comprising
    means for providing said second factor as a function of a desired gain and of a desired black level as well as of said desired gamma correction, and
    second summing means for adding a factor indicative of said desired black level to said offset gamma corrected signal as output by said second multiplying means to produce an offset corrected signal for providing gain and black level corrections as well as gamma correction.

11. Color correction apparatus according to claim 10, in which said second factor comprises said desired gain as minuend and the sum of said desired black level and said desired gamma correction as subtrahend.

12. Color correction apparatus according to claim 11, further comprising blanking means for selectively blanking said offset corrected signal to a predetermined level during predetermined portions of said video signal.

* * * * *